May 7, 1963  E. J. JOHNSTON  3,088,189
TIRE CARCASS DISK ROLLS WITH RETAINING WASHERS
Filed Dec. 7, 1959
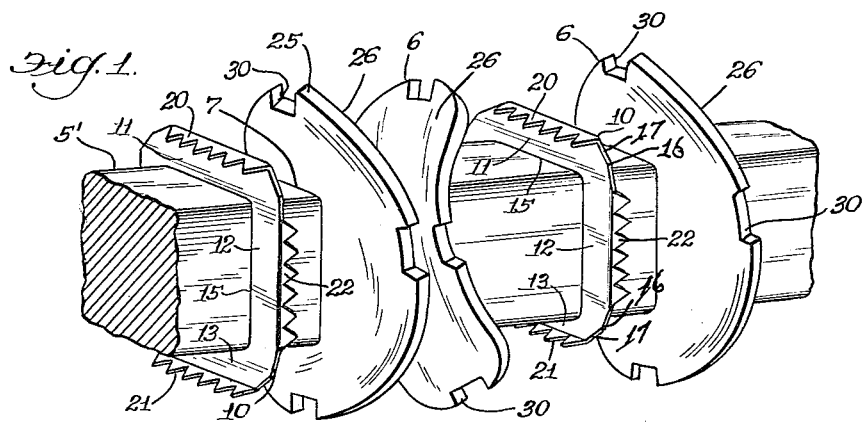
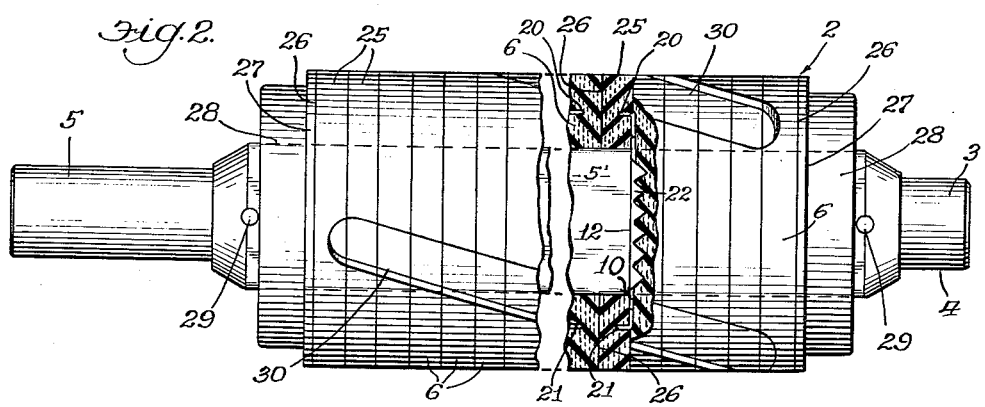
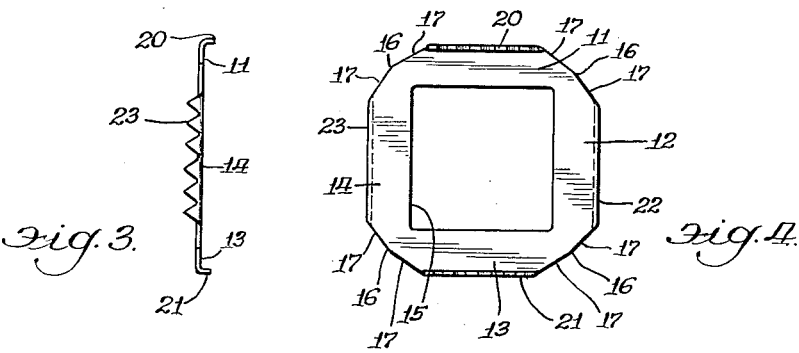
Inventor
Edward J. Johnston
Atty.

United States Patent Office 3,088,189
Patented May 7, 1963

3,088,189
TIRE CARCASS DISK ROLLS WITH RETAINING WASHERS
Edward J. Johnston, La Grange Park, Ill., assignor to International Harvester Company, Chicago, Ill., a corporation of New Jersey
Filed Dec. 7, 1959, Ser. No. 857,849
1 Claim. (Cl. 29—125)

This invention relates to crushing rolls particularly designed for crushing hay and the like.

The International Harvester Company is presently marketing a hay crusher which comprises a pair of superposed crushing rolls which are in engagement with each other under high pressure developing a bite therebetween through which the hay is passed to crush the same to accelerate drying thereof and improve its palatability. These rolls are made of disks of tire carcass material which are fiber impregnated rubber disks of circular form and which are sleeved onto a shaft and compacted into a unitary structure.

The construction of these rolls is extremely critical in that it must be insured that the disks are so compacted so as to engage each other under full face contact. They are compacted under extremely high pressure to prevent voids between the disks. The disks are mounted on a square or other non-round shaft and intended to remain in compacted assembly without slipping. However, even under the most favorable manufacturing conditions there are occasions when because of the fact that the disks are made of tire carcass and these have non-uniform characteristics as to flexure, structure, curvature and thickness and differences in the material in the various tires, that by the happenstance assembly of such disks, and no matter how much pressure is applied within reasonable manufacturing limits, that these disks do not conform to each other and further that after a short use they tend to slip and rotate about the shaft. As soon as this occurs the roll is very quickly destroyed.

A general object of the invention is to provide a novel mechanical interlocking means between the disks themselves and with respect to the shaft.

A further object of the invention is to provide a novel arrangement for interlocking the disks with the shaft comprising a washer which is sleeved over the shaft and interlocked therewith against rotation and which comprises gripping means thereon which digs into the adjacent disks and interlocks therewith.

A still further object of the invention is to provide a novel arrangement for interlocking the disks which is of simple, durable and efficient design and which is positive in its action and easily assembled.

A more specific object is to provide a novel gripping washer interposed between pairs of disks, the washer having a non-round opening complementally mounted on a complementary non-round shaft.

These and other objects of the invention will become more apparent from the specification and the drawings, wherein:

FIGURE 1 comprises a fragmentary perspective view illustrating several of the disks and washers in assembly position;

FIGURE 2 is a broken apart side elevational view partially in axial section of a crushing roll made in accordance with the invention;

FIGURE 3 is an edge view of the interlocking member; and

FIGURE 4 is a side elevational view of the interlocking member.

Describing the invention in detail and having particular reference to the drawings, there is shown a crushing roll generally designated 2 which comprises a center shaft 3 having cylindrical end portions 4 and 5 by means of which the shaft is mounted on associated roller bearing means.

The intermediate portion 51 of the shaft 3 is preferably square or non-round and the portion 5' having mounted thereon a plurality of tire carcass fiber impregnated disks 6.

Each disk 6 has a square central opening 7 by means of which the disk is sleeved onto the shaft portion 5' and interlocked therewith. It will be understood that inasmuch as the disks 6 are of a yieldable nature that with adequate load being applied thereto that the holes 7 in the center of the disks will elongate and that the disk can be made to rotate with respect to the square portion 5' of the shaft.

The present invention provides means in the form of washers or interlocking members 10 which are disposed between pairs of disks 6, 6 which function to interlock the disks with the shaft. Each interlocking member comprises preferably a metallic structure having a generally square plate-like portion including four sides 11, 12, 13 and 14 about a square center opening 15. The corners 16 my be cut off by the two angular shears as at 17 and 17 so as to round them out somewhat, as best seen in FIGURE 4.

The center of body portion 10 which is of about 16 gauge sheet steel is provided with outwardly directed sets of teeth 20, 21 on the side portions 11 and 13 which are directed axially in the same direction and the other side portions 12 and 14 are provided with sets of teeth 22 and 23 which are directed axially in the opposite direction to the sets of teeth 20 and 21. It will be seen that the teeth 20 and 21 will penetrate the disk 6 (which are about ½" thick) at diametrically opposite sides of the shaft at the corresponding side of the washer and that the other teeth 22 and 23 will simultaneously dig in and engage the disk 6 at the opposite side of the washer. Thus the pair of disks and the washer interlocking the same become a unitary assembly and an arrangement is provided which does not alternate the washers with the disks but which groups the disks into pairs and the washer is interposed between each pair of disks. It will be seen that the diametrical distance between the corresponding sets of teeth 20 and 21, as well as 22 and 23, is somewhere about two-thirds of the diameter of the disks 6, 6, thus the interlocking washers are spaced a considerable distance inwardly of the outer peripheries 25 of the disks so as not to interfere with peripheral flexing of the disks 6.

It will be seen that the pairs of disks 6, 6 are sleeved onto the shaft with the interlocking washer therebetween and that the remote sides of the pairs of disks are in direct engagement with the remote sides 26 of the next adjacent pair of disks except for the outermost disks which at their remote sides 26 engage with the flanges 27 of the retaining members 28 which are interlocked by means of pins 29 with the respective ends of the shaft.

The disks are peripherally grooved as at 30 to provide tooth-like formations to obtain aggressiveness in picking up the hay. It will be understood that the disks normally are curved because they are cut out from the tire carcass and the curvature is of course in two directions and that the disks must be compacted under such axial pressure as to cause the teeth to bite into the respective disks and at the same time flatten the disks out and engage them under full face contact with each other.

The washers being metallic also serve in an additional function and that is to dissipate heat which may develop in the outer peripheral portions of the disks. The heat is passed through the shaft and thus is not allowed to concentrate to a point of destruction.

I claim:

A hay conditioning roller comprising an elongated shaft having a substantially square center portion, a laminated roller body on said center portion of the shaft comprising a plurality of fiber impregnated annular rubber disks having substantially square center openings snugly admitting the center section of the shaft therethrough, said disks arranged in pairs, a flat metallic retainer disposed between the disks of each pair only, each retainer having a center opening complemental to said square center section of the shaft and receiving the same therethrough and having four quadrilaterally arranged peripheral toothed edge portions respectively paralleling the sides of the center section of the shaft, two of the opposite edge portions of the retainer being directed axially of the roll in one direction and the other two in the opposite direction, said toothed edge portions being equidistantly spaced from the axis of the roller inwardly of the periphery of the body of the roller and respective toothed portions being aligned with each other axially of the roll, and means clamping said disks and retainers axially under pressure into a unitary assembly.

References Cited in the file of this patent

UNITED STATES PATENTS

| | | |
|---|---|---|
| 1,628,835 | Furbush | May 17, 1927 |
| 2,247,874 | Crites | July 1, 1941 |
| 2,324,050 | Shelley | July 13, 1943 |
| 2,416,123 | Siemen | Feb. 18, 1947 |
| 2,720,692 | Lorig | Oct. 18, 1955 |
| 2,801,461 | Kusters | Aug. 6, 1957 |